Patented Feb. 12, 1952

2,585,336

UNITED STATES PATENT OFFICE 2,585,336

QUICK-BREAKING BITUMINOUS EMULSION

Paul E. McCoy, San Francisco, Calif., assignor, by mesne assignments, to American Bitumuls & Asphalt Company, San Francisco, Calif., a corporation of Delaware No Drawing. Application June 14, 1948, Serial No. 32,991

6 Claims. (Cl. 252—311.5)

The present invention relates to non-alkaline, quick-breaking bituminous emulsions having water as the continuous phase and a water-insoluble, water-dispersible, bituminous material, for instance, asphalt, as the dispersed phase. More particularly, the invention relates to such emulsions containing sulfonated tall oil and having unusual properties, such as superior demulsibility and dehydration characteristics, said emulsions being suitable for use in paving construction and the like.

Quick-breaking aqueous emulsions of a bituminous substance, for example, petroleum asphalt, are characterized by the property of quickly breaking down or separating and coalescing when diluted with water and/or mixed with electrolytes or contaminated with other foreign matter. Such emulsions are useful as adhesives, binding materials and in coating compositions, and find particular utility in road building. When a quick-breaking emulsion is sprayed or poured on aggregate or otherwise applied thereto, the emulsion breaks rapidly, the water is liberated and the asphalt coats and binds the aggregate.

Heretofore the aforesaid emulsions have been prepared by a process which involves mixing a suitable molten bituminous material, such as asphalt, with an aqueous solution of a caustic alkali whereby to form an emulsion. The alkali reacts with the saponifiable constituents, or asphaltogenic acids, present in the asphalt, the reaction products serving as the dispersing or emulsifying agent. Another method of preparing such emulsions has been to add a saponifiable organic acid to the molten asphalt, followed by emulsification while saponifying with an aqueous caustic solution the added acid and the saponifiable constituents of the asphalt. In other instances it has been found advantageous to mix molten asphalt with a solution of the soap reaction products of an organic acid and an alkali, followed by emulsification of the whole.

In all of the foregoing prior art practices of preparing quick-breaking bituminous emulsions, the emulsions are characterized by an aqueous phase of high alkalinity with a pH generally in excess of 10. The alkalinity of these emulsions is inherent in the methods of preparing the emulsions, and is required in forming or preserving the emulsifying or dispersing effects of the saponified products. Below a pH between about 8.5 and 9 the emulsifying or dispersing agent remains undissociated or unhydrolized, with the result that at the low pH the emulsions are quite unstable.

Because of the alkaline nature of prior art quick-breaking emulsions, certain disadvantages inhere in such emulsions and detract from the usefulness thereof. For example, such alkaline emulsions have poor dehydration characteristics, as a result of which films laid from such emulsions do not dry uniformly throughout the film thickness, and do not develop a complete and thorough set but tend to skin over. Moreover, due to the presence of water redispersible emulsifying agents, coatings from such emulsions do not adhere well to hydrophilic surfaces. In addition, the presence of alkali in such emulsions tends to lower the effectiveness of certain additives, such as certain metallic salts, for example, certain dichromates, introduced thereinto to promote adhesion. Another disadvantage of the alkalinity of such emulsions resides in the corrosion to aluminum vessels and equipment. A further disadvantage of quick-breaking bituminous emulsions having an alkaline aqueous phase is that such emulsions undergo undesirable changes in pH, demulsibility, and adhesion during storage.

An object of the invention is to prepare non-alkaline quick-breaking bituminous emulsions.

Another object of the invention is to prepare non-alkaline quick-breaking bituminous emulsions having superior demulsibility characteristics.

A further object of the invention is to prepare non-alkaline quick-breaking emulsions of improved dehydration characteristics, that is, emulsions capable of laying films which will set and dry uniformly throughout the film thickness without skinning.

A still further object of the invention is to prepare non-alkaline quick-breaking emulsions having superior stability characteristics in storage.

Yet another object of the invention is to prepare quick-breaking bituminous emulsions having superior adhesion characteristics.

Other objects and advantages of the invention will be apparent from the following description of the invention.

The present invention is predicated on the discovery that the oil-in-water type emulsions herein described containing sulfonated tall oil as the emulsifying agent are non-alkaline, quick-breaking emulsions capable of overcoming the shortcomings of prior art quick-breaking emulsions and possess the advantages hereinabove indicated. By the term "non-alkaline" it is meant that emulsions of the present invention are substantially less alkaline than known quick-breaking emulsions, and give, for example, a neutral reaction in the presence of phenolphthalein, that is, at a pH between about 8.5 and 9 and lower. The pH of the emulsions of the present invention is preferably around 7, but may be even lower or as low as operating equipment can withstand the corrosive effects of an acid condition. Thus, the emulsions of the present invention may range in pH from about 8.5 to about 3.

I have found that the improved effects of the emulsions prepared in accordance with the invention are peculiar to sulfonated tall oil as the dispersing medium, or emulsifying agent. As will hereinafter appear, other sulfonated materials of mineral, animal and vegetable origin are incapable either of forming quick-breaking emulsions or of imparting the improved properties and are therefore unsuitable for purposes of the present invention.

The bituminous materials emulsified in accordance with the present invention are normally solid, semi-solid or viscous liquids at ordinary atmospheric temperatures. A classification of the suitable bituminous substances contemplated by the present invention appears in U. S. Patent No. 2,396,669. Examples of operative materials are bitumens, such as petroleum and native asphalts, native mineral waxes, asphaltites; pyrobitumens, such as asphaltic pyrobituminous shales, lignite, peat; pyrogeneous distillates, such as petroleum paraffin, peat paraffin, oil-gas tar, coal tar; pyrogeneous residues, such as blown petroleum asphalts, sludge asphalts, pressure tars, residual oils, oil-gas tar pitch, wood pitch, etc. Of these materials petroleum asphalt is most advantageously used, and it may be produced by steam refining, by air-blowing, by solvent extraction methods or by a combination of such methods.

In effecting the emulsions contemplated by the present invention, processes heretofore employed in preparing quick-breaking bituminous emulsions are generally applicable. For example, molten bituminous material, such as asphalt, and the sulfonated tall oil product may be emulsified in a colloid mill, as by feeding thereinto a stream of molten asphalt and a second stream of an aqueous suspension or mixture of the sulfonated tall oil product. Or, if desired, the emulsion may be formed by the vigorous agitation of a suitable quantity of molten bituminous substance with an aqueous solution or dispersion of the sulfonated tall oil product maintained at an elevated temperature to keep the bituminous material in the molten condition, as, for example, by introducing the bituminous material into the sulfonated tall oil in portions and effecting emulsification. In cases where the nature of the bituminous substance permits; that is, where the bituminous matter is susceptible to ready emulsification, for example, certain asphalts, such as Mexican and California petroleum asphalts, the desired quantities of the water continuous phase, the asphalt dispersed phase, and the dispersing medium sulfonated tall oil product may all be mixed at one time in mixing apparatus capable of effecting emulsification of the ingredients.

The sulfonated tall oil dispersing medium contemplated by the present invention are the sulfonation products of tall oils derived from the sulfate and sulfite process of treating wood pulp. Coniferous woods are digested, usually under pressure by means of a solution of sodium hydroxide, sodium sulfite, and smaller proportions of sodium carbonate and sulfate. The resulting "black liquor" is evaporated and then treated with sodium sulfate to salt out the soap. The soap is separated, and purified by washing with water and steam. The purified soap is then acidified while agitating with sulfuric acid of 30 to 50 per cent strength, following which the "tall oil" is run off from the aqueous solution while still hot. In general, the chemical constitution of tall oil comprises, on the average, fatty acids, 45 to 55 per cent; rosin acids, 40 to 45 per cent; unsaponifiable matter, such as higher alcohols, sterols, etc., about 6 to 10 per cent. In general, tall oil has about the following specifications: iodine number, 150 to 180; saponification number, 160 to 170; acid number, 150 to 160; rosin acids number, 70 to 80; pour point, not in excess of about 45° F.; viscosity in Saybolt Universal seconds, 110 to 130; specific gravity, 0.96 to 0.98; flash point, 350 to 370° F.; and fire point, 410 to 430° F.

The preparation of the sulfonated material contemplated by the present invention may be effected by treating the tall oil hereinabove described according to methods and principles employed in the art of sulfonation to produce the commercial sulfonated tall oil product. For example, sulfonation may be accomplished by contacting tall oil with a suitable sulfonating agent, such as concentrated or fuming sulfuric acid, chloro-sulfuric acid, sulfur trioxide, acetyl sulfuric acid at a temperature, such as about 10° C. to about 50° C., at which undesirable charring of the tall oil molecules and undesirable side reactions do not occur or are minimized while effecting substantially complete sulfonation of the sulfonatable constituents of the tall oil.

Following the sulfonation reaction, the excess acidity is advantageously neutralized with a suitable base, such as alkali metal and alkaline earth metal hydroxides or oxides, for example, caustic soda and lime, and the salt derivatives resulting from the neutralization of the sulfonated tall oil are also contemplated by the invention.

In order that quick-breaking bituminous emulsions fulfill their purpose efficiently, it is desirable that these emulsions have certain properties, such as good demulsibility, high dehydration and good storage characteristics. Certain tests have accordingly been devised to evaluate these properties and to serve as criteria for the grading of the emulsions.

Thus, the so-called "demulsibility" test described in ASTM D244-42 (Demulsibility) has for its purpose the determination of the ability of quick-breaking bituminous emulsions to break or separate upon contact with the material to be coated. In performing the test 100 g. of the emulsion are mixed with 35 ml. of a 0.02 normal calcium chloride solution and the percentage of asphalt broken out of the emulsion determined. Most specifications for quick-breaking bituminous emulsions as described, for example, in ASTM D401-40, provide for about 60 per cent demulsification in ASTM demulsibility test D244-42 or higher.

A convenient test for the determination of the rate of dehydration, and one utilized for obtaining the data hereinafter given, is as follows:

One hundred g. of the emulsion to be tested is placed in a tared pyrex dish, 77 mm. in inside diameter by 40 mm. in height, having a flat bottom and straight sides. The dish is placed in the center of a shallow pan about 5 inches in diameter and 50 g. of granular anhydrous calcium chloride is spread in the pan so that it surrounds the dish containing the emulsion. The entire unit is then placed in a constant temperature oven set at 100° F. At the end of exactly 96 hours, during which time the sample is not disturbed by stirring or excess movement, the loss of weight of the emulsion is determined. The dehydration loss is expressed as the per cent of the loss in this test in 96 hours based on the loss in a test for residue at 163° C. as described in paragraph 15 of Tentative Methods, ASTM Designation D244-36T. A satisfactory quick-breaking emulsion will show a dehydration loss of about 60 per cent or more which indicates that the emulsion when applied will produce a film of coating which will set and dry uniformly without skinning over at the surface.

Another important property of quick-breaking emulsions is stability against coalescence and undue settlement in storage. A suitable test for the measurement of this quality is described in ASTM Designation D244-42 (Settlement). According to the test a 500 ml. sample of the emulsion is placed in each of two glass cylinders. The cylinders are stoppered air-tight and allowed to remain undisturbed at laboratory air temperature for 5 days. After the five-day period, 55 ml. samples are siphoned or pipetted from the top of each cylinder without disturbing the remainder of their contents. Fifty g. of each of the two samples, after each has been thoroughly mixed separately, are weighed into separate low-form glass beakers and the asphaltic residue determined by evaporation at 163° C. for 3 hours in the apparatus described in ASTM Designation D6. After removal of the first sample, approximately the next 390 ml. are siphoned off from each of the cylinders. The residue in the cylinders is mixed thoroughly and 50 g. is weighed out from each of them and the amount of asphaltic residue determined by evaporation as above. The numerical difference between the average percentage of asphaltic residue from the two top samples and the average percentage found in the two bottom samples are then determined. Standard specifications for quick-setting emulsions call for a settlement value of not more than 3, as described, for example, in ASTM D401-40.

As illustrative of the superior properties of the emulsions prepared in accordance with the present invention, emulsions were prepared employing sulfonated tall oil as the emulsifying agent and other emulsions wherein other sulfonated oils were substituted therefor, and the properties of the various emulsions noted.

As specific examples of the comparative emulsions prepared, the following are given, the numbers indicating per cent by weight:

| Example No. | 1 | 2 | 3 | 4 | 5 |
|---|---|---|---|---|---|
| Asphalt (50-60 pen.) | 56 | 56 | 56 | 56 | 56 |
| Sulfonated tall oil | 3 | | | | |
| Sulfonated castor oil | | 3 | | | |
| Sulfonated Neat's-foot oil | | | 3 | | |
| Sulfonated whale oil | | | | 3 | |
| Sulfonated mineral oil | | | | | 3 |
| Anti-settlement agent (sodium carboxy methyl cellulose) | 0.1 | 0.1 | 0.1 | 0.1 | 0.1 |
| Water | 40.9 | 40.9 | 40.9 | 40.9 | 40.9 |

The emulsions of the foregoing examples were prepared by charging separate streams of molten asphalt at a temperature of about 220° F. to 230° F., and water mixed with the appropriate sulfonated oil at a temperature of about 140° F. to 175° F., to a Charlotte colloid mill of a type described on page 556 of Asphalts and Allied Substances, 5th edition, by Abraham.

Following the preparation of the emulsions, comparison of the emulsions was made by subjecting the emulsions to the various tests hereinabove described and indicated below, and the differences noted.

| Example No. | 1 | 2 | 3 | 4 | 5 |
|---|---|---|---|---|---|
| Emulsifying Agent | (Sulfonated tall oil) | (Sulfonated castor oil) | (Sulfonated Neat's-foot oil) | (Sulfonated whale oil) | (Sulfonated mineral oil) |
| Residue | 57.2 | 57.6 | 54.8 | 57.2 | 57.4 |
| Demulsibility | 65.0 | 22.4 | 51.5 | (3) | 0.0 |
| Dehydration | 62.0 | 26.9 | (1) | 62.3 | 50.7 |
| Settlement | 2.75 | 2.8 | (2) | 9.0 | N3.8 |
| Viscosity (at 77° F. Saybolt furol) | 18.5 | 18.5 | (2) | 17.0 | 20.4 |
| pH | 8.1 | 7.9 | 7.4 | 7.8 | 9.6 |

[1] Broken, unfit for testing.
[2] Broken.
[3] Trace.

The residue test above listed was performed according to the procedure described in ASTM Designation D244-42 (Distillation), residue specifications usually calling for a residue between about 55 and 60 per cent. The tests of demulsibility, dehydration and settlement were carried out as hereinabove described.

It is apparent from the foregoing table that the emulsion prepared with sulfonated tall oil is the only satisfactory one from the point of both demulsibility and dehydration. Moreover, the aforesaid emulsion has good storing qualities, as indicated by the settlement test. The emulsion of Example 2, employing a sulfonated vegetable oil, such as castor oil, has poor dehydration and demulsibility characteristics and is unsatisfactory although showing a good settlement test. The emulsion of Example 3, illustrating the use of a sulfonated animal oil, such as sulfonated neat's-foot oil, is unsatisfactory and breaks so rapidly that neither the dehydration nor the settlement test can be performed thereon. This emulsion is also unsatisfactory. Emulsions of Examples 4 and 5 are totally unsatisfactory and partake of the nature of mixing type emulsions as shown by substantially no demulsibility and good dehydration characteristics, qualities which characterize the mixing type emulsions. As a matter of fact the emulsion exemplified in Example 5 had an excellent cement mixing test, a test which is extensively employed to evaluate slow-setting or mixing type emulsions.

I have found that the amount of sulfonated tall oil employed to prepare emulsions contemplated by the present invention may vary from about 0.1 per cent to about 10 per cent (about 0.5 to 5 per cent of the emulsion) based on the bituminous matter desired to be emulsified. In general, the emulsions of the present invention may be made up within about the following limits:

| Ingredient: | Per cent by weight |
| --- | --- |
| Bitumen | 50 –70 |
| Sulfonated tall oil | 0.5– 5.0 |
| Water | 40 –50 |

To the above may be added a small amount, such as about 0.1 per cent based on the total amount of ingredients, of an anti-settlement agent, such as sodium carboxy methyl cellulose.

Emulsions made up in the relative proportions falling within the above indicated limits meet usual residue test specifications. It is understood, however, that in the absence of such specifications, the amounts of water and bituminous substance may be varied over even a wider range than that given to prepare emulsions of varying residue value as will be appreciated by those skilled in the art.

It is often desirable to improve the adhesion or anti-stripping properties of oil-in-water type emulsions, so that when the emulsion is mixed with aggregate and the mixture allowed to dry, a firm, stable bond between the bitumen and the aggregate results. A number of substances, such as certain alkali metal salts and heavy metal salts, for example, alkali metal dichromates and ferric chloride, have been proposed as adhesion promoting agents, as is described in my Patents Nos. 2,412,526 and 2,313,759, and in Auer Patent No. 2,396,669. I have now found that the effectiveness of such agents is enhanced by the presence of sulfonated tall oil in the emulsion, as is illustrated hereinbelow.

In my copending application, Serial No. 665,330, filed April 26, 1946, now Patent No. 2,481,323, September 6, 1949, I have described means for the incorporation of adhesion promoting agents into oil-in-water type bituminous emulsions, including quick-breaking emulsions, without deleterious effects on emulsion stability.

According to the aforementioned application, anti-stripping agents, for example, water-soluble salts of oxy-acids of chromium, particularly alkali metal dichromates, may be added, without breaking the emulsions and causing excessive shot formation, as a mixture with a volatile or fugitive nitrogen base, such as ammonia, morpholine, trimethylamine, methylamine, ethylamine, ethylene diamine, diethyl amino ethanol and ethyl monoethanolamine.

The mixture of dichromate and base is preferably prepared by the addition of the base to a solution of the dichromate of, say, 10 per cent concentration. Sufficient base is added to the chromate solution to raise the pH thereof to about 7 to 9.5. The so treated chromate solution is then added to the emulsion slowly and with stirring in an amount sufficient to produce the desired adhesion promoting effect and calculated to give the desired concentration of finished metal salt in the emulsion, that is, from about 0.05 per cent to about 1 percent, and preferably from about 0.1 per cent to 0.5 per cent.

Emulsions prepared with sulfonated tall oil in accordance with the present invention have improved adhesion properties and when treated with an anti-stripping agent are far superior in adhesion characteristics to conventionally prepared quick-breaking emulsions similarly treated with the same amount of the same anti-stripping agent.

To illustrate, sulfonated tall oil emulsions were treated with a 10 per cent solution of sodium dichromate neutralized with dilute $NH_4OH$ to a pH of 7. The anti-stripping agent solution was added very slowly with stirring to the emulsions, and was added in sufficient amounts to separate emulsions to effect a salt content of 0.1, 0.15, 0.20, 0.25 and 0.3 per cent. Conventionally prepared quick-breaking emulsions were made up to the same salt contents. Adhesion was then compared by subjecting the emulsions to the following test:

One hundred g. samples of Massachusetts rhyolite, graded so as to pass entirely through a ⅜-inch sieve and to be retained completely on a No. 10 sieve, were heated at 325° F. for one hour. To the heated samples there was added 8 g. of the emulsion being tested. The rhyolite-emulsion samples were mixed for approximately 2 minutes under infrared lights until all stone fragments were completely coated. After mixing, the samples were placed under infrared lights at approximately 210° F. for 2 hours. At the end of this period each sample was remixed for one minute, and 50 g. of each were placed in 400 ml. of boiling distilled water and stirred with a glass rod for one minute at the rate of 60 revolutions per minute of the rod. After stirring, water was drawn off the sample, which was then allowed to dry in air. When all samples were dry, they were examined to determine the percentage aggregate coated with asphalt (adhesion). The percentages obtained were the average of determinations made by five different experienced observers and are tabulated below:

| Amount Salt in Emulsion | Sulfonated Tall Oil Treated Emulsions | Conventionally Prepared Emulsions |
| --- | --- | --- |
| Per Cent | Per Cent | Per Cent |
| None | 20 | 10 |
| 0.10 | 25 | 20 |
| 0.15 | 40 | 25 |
| 0.20 | 60 | 30 |
| 0.25 | 80 | 50 |
| 0.30 | 90 | 60 |

The above data indicate that not only is sulfonated tall oil treated emulsion without an adhesion promoting agent superior in adhesion characteristics to conventionally prepared emulsions also lacking an adhesion agent, but moreover that at all levels of salt concentrations the presence of sulfonated tall oil in the emulsions enhances the effectiveness of adhesion agents, a 100 per cent improvement being shown at a 0.2 per cent salt concentration. Beyond a salt concentration of 0.3 per cent, it was found that conventionally prepared quick-breaking emulsions broke very rapidly and could not therefore be compared.

As will be appreciated by those skilled in the art, the quick-breaking emulsions herein contemplated may be converted into slow-setting or mixing type emulsions by the treatment thereof with a stabilizing agent or protective colloid, such as blood, glue, casein, starch and various gums, for example, gum acacia, agar-agar, etc.

Obviously many modifications and variations of the invention as hereinbefore set forth may be made without departing from the spirit and scope thereof, and therefore only such limitations should be imposed as are indicated in the appended claims.

I claim:

1. A quick-breaking oil-in-water type emulsion consisting essentially of water, a bitumen, a water-soluble salt of an oxy-acid of chromium in a small amount sufficient to improve substantially the adhesion of said bitumen for hydrophilic aggregate, and sulfonated tall oil in an effective amount, up to about 10%, based on the bitumen, for emulsification of said bitumen, whereby the adhesion-promoting properties of said water-soluble salt of an oxy-acid of chromium are substantially enhanced, and the emulsion has superior properties of demulsibility and dehydration, in addition to the bitumen thereof having superior adhesion for hydrophilic aggregate.

2. An emulsion substantially as described in claim 1, wherein the water-soluble salt of an oxy-acid of chromium is an alkali metal dichromate.

3. An emulsion substantially as described in claim 1, wherein the bitumen is asphalt.

4. An emulsion substantially as described in claim 2, wherein the alkali metal dichromate is present in an amount of about 0.2 to 0.3 per cent based on the emulsion.

5. An emulsion substantially as described in claim 4, wherein the bitumen is asphalt.

6. An emulsion substantially as described in claim 4, wherein the alkali metal dichromate is sodium dichromate.

PAUL E. McCOY.

REFERENCES CITED

The following references are of record in the file of this patent:

UNITED STATES PATENTS

| Number | Name | Date |
| --- | --- | --- |
| 1,888,295 | Smith | Nov. 22, 1932 |
| 2,190,604 | Montgomerie et al. | Feb. 13, 1940 |
| 2,412,526 | McCoy | Dec. 10, 1946 |

FOREIGN PATENTS

| Number | Country | Date |
| --- | --- | --- |
| 263,307 | Great Britain | Dec. 30, 1926 |
| 547,242 | Great Britain | Aug. 19, 1942 |
| 310,541 | Germany | Jan. 30, 1919 |
| 314,017 | Germany | July 29, 1919 |